UNITED STATES PATENT OFFICE.

RUDOLF SCHMITT, OF DRESDEN, SAXONY, GERMANY, ASSIGNOR TO FRIEDRICH VON HEYDEN, OF SAME PLACE.

MANUFACTURE OF SALICYLIC ACID.

SPECIFICATION forming part of Letters Patent No. 334,290, dated January 12, 1886.

Application filed July 31, 1884. Serial No. 139,312. (No specimens.) Patented in Germany June 24, 1884, No. 29,939; in France July 5, 1884, No. 163,167; in England July 15, 1884, No. 10,167; in Belgium July 15, 1884, No. 65,781; in Luxemburg July 15, 1884, No. 421, and in Spain November 20, 1884.

*To all whom it may concern:*

Be it known that I, RUDOLF SCHMITT, a subject of the German Emperor, and a resident of Dresden, in the Kingdom of Saxony, Germany, have invented a new and useful Improvement in the Manufacture of Salicylic Acid and of the Homologues thereof, of which the following is a specification.

The production of salicylic acid is based upon the action of carbonic anhydride upon alkaline phenolates at a temperature of from 200° centigrade. The action that takes place during this remarkable conversion is represented by the following equation:

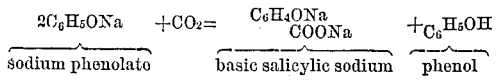

sodium phenolate    basic salicylic sodium    phenol

Thus out of two molecules of phenol sodium only one molecule of phenol is converted into salicylic acid, the phenol being regenerated from the other molecule and is distilled during the operation.

The working of this process being somewhat obscure, I have made numerous experiments with a view to obtaining a clearer knowledge of the synthesis of salicylic acid. This led, in the first place, to a simple production of the diphenyl carbonate and the conversion of this ether into salicylic acid, and, in the next place, to the process hereinafter described.

I have ascertained that it is possible to produce the heretofore-unknown alkaline and earthy alkaline salts of acid phenyl carbonic ether, (sauren phenykohlsensauren ethers,) and also that these salts, when heated to about from 120° to 140° centigrade, become directly converted quantitatively into normal salts of salicylic acid (salicylsaure salze) without any separation of the phenol. In this manner it has become possible to produce for the first time one molecule of salicylic acid from one molecule of phenol.

The manufacture is carried out according to this invention in the following manner:

First. The dry phenolate or phenolates of the alkalies or of the earthy alkalies is or are exposed at the ordinary temperature to the action of dry carbonic acid under pressure until absorption takes place, and there is formed quantitatively the alkaline or the earthy alkaline salts of the acid carbonic phenyl ethers, phenyl sodium carbonate in particular being produced from the phenol sodium: $C_6H_5ONa + CO_2 = \genfrac{}{}{0pt}{}{C_6H_5OCO}{NaO}$ When the salts are heated in a hermetically-closed vessel or digester to from about 120° to 140° centigrade for a few hours, the molecular transformation into the simple salicylic salt proceeds quantitatively without separation of phenol, the phenyl sodium carbonate in particular being transformed into salicylic sodium, according to the following equation: $C_6H_5OCO = \genfrac{}{}{0pt}{}{C_6H_4COONa}{OH.}$ When the vessel is opened, no excess of pressure is present. The perfectly dry pulverulent salicylic salt (salicylsaure salze) is then dissolved in water, the salicylic acid precipitated by a mineral acid, and purified by crystallization (umkrystallisation) in the usual manner.

Second. The phenolate or phenolates of the alkalies and of the earthy alkalies is or are rapidly dried and placed in a vessel provided with a tight-fitting cover, (autoclaven,) and dry carbonic acid is pumped or introduced into it under pressure, preferably by means of a force-pump, so long as may be necessary to form the phenyl carbonic salts. (Phenylkohlensauren salze.) The vessel should be kept well cooled during this pumping or forcing operation. The vessel is kept closed as long as the carbonic acid is not perfectly absorbed and any excess of pressure is present. The mass is then allowed to stand for a few hours, in order to admit of the complete conversion of the phenolate into the phenyl carbonic salt. The vessel is then heated in an air bath for a few hours to from 120° to 140° centigrade, in order to effect the conversion into normal salicylic salt or salts.

Third. The dry phenolate is placed in a vessel with an air-tight cover, and a sufficient quantity of solid carbonic acid is introduced (enigeschüttes) to form the phenyl carbonic salt. The apparatus is then quickly closed and treated as hereinbefore described with reference to operation No. 2. The homologues of the acid are produced in the same manner.

The vessels employed in carrying out the second and third operations hereinbefore described are preferably provided with the arrangement (Einrichtung der Birnen) employed in Natterer's apparatus for condensing carbonic acid.

I am aware that the alkaline phenolates have been treated with carbonic acid for the manufacture of salicylic acid, as shown in United States Patent to Graf, No. 166,863, August 17, 1875, and British Patent to Merck, No. 4,094 of 1877. According to those patents sodium phenolate is treated with the carbonic acid in a still at a high temperature and low or atmospheric pressure to obtain salicylic sodium, $C_6H_4{ONa \atop COONa}$; but according to my invention I treat the sodium phenolate with the carbonic acid in a closed vessel at a temperature at or below that of the atmosphere, in and at a pressure above that of the atmosphere, even at thirty to forty atmospheres, to obtain neutral salicylic sodium, $C_6H_4{OH \atop COONa}$.

According to those patents a large quantity of carbolic acid is driven off, whereas by my process every particle of carbolic acid is converted into salicylate. Graf and Merck work directly to produce the basic salicylic sodium, whereas I first convert the phenolates by the action of carbonic acid into the phenyl carbonic alkaline salts, and afterward convert these salts into neutral salicylic acid without any separation of phenol.

What I claim as my invention, and desire to secure by Letters Patent, is—

The process of manufacturing salicylic acid and its homologues, consisting in first subjecting the phenolates of the alkalies and earthy alkalies to the action of dry carbonic acid under pressure at low temperatures, in order to produce phenyl carbonic alkaline and earthy alkaline salts, and afterward converting these salts into salicylates (salicylic salts) and their homologues by heating them in hermetically-closed vessels at a temperature of about 120° to about 140° centigrade, substantially as herein described.

In testimony whereof I have hereunto set my hand, this 3d day of July, 1884, in the presence of two subscribing witnesses.

RUDOLF SCHMITT.

Witnesses:
PAUL DRUCE LUMKE,
CARL KNOOP.